United States Patent Office 3,652,581
Patented Mar. 28, 1972

3,652,581
PRODUCTION OF SUBSTITUTED IMIDAZOLES
Hermann Spaenig, Limburgerhof, and Anna Steimmig and Jakob Sand, Ludwigshafen, Germany, assignors to Badische Anilin- & Soda-Fabrik Aktiengesellschaft, Ludwigshafen (Rhine), Germany
No Drawing. Filed Dec. 16, 1968, Ser. No. 784,237
Claims priority, application Germany, Dec. 16, 1967,
P 16 70 293.5
Int. Cl. C07d 49/36, 49/38
U.S. Cl. 260—309.2        7 Claims

ABSTRACT OF THE DISCLOSURE

Production of imidazoles substituted on nitrogen by reacting imidazoles with aliphatic alcohols or ethers at 200–450° C. in the presence of, as catalyst, alumina, pumice or titanium oxide having at least 5% phosphoric acid deposited thereon or alumina impregnated with at least 5% of $Ca(H_2PO_4)_2$ or thorium oxide in an amount equivalent to at least 5% $Th(NO_3)_4$. The products are valuable intermediate for the production of dyes, textile auxiliaries and insecticides.

---

The invention relates to the production of imidazoles bearing substituents on the nitrogen atom by reaction of imidazoles with aliphatic alcohols or ethers.

It is known from Hofmann, "Imidazole and its derivatives (1953), page 49, that imidazoles can be alkylated on the free imino group with alkyl halides or alkyl sulfates. It is advantageous to use metal salts of the appropriate imidazoles as the starting materials and to carry out the reaction while excluding water in order to improve the yield of end product. Alkylation on the nitrogen atom by means of esters of oxalic acid is another known method. All these methods start from alkylating agents which are fairly troublesome to prepare and give unsatisfactory yields of imidazoles alkylated on the nitrogen atom. The purity of the end product is impaired by the formation of corresponding quaternary imidazolium compounds.

It is the object of this invention to provide a new method of producing imidazoles bearing substituents on the nitrogen atom in a simple way and in good yields.

These and other objects of the invention are achieved and substituted imidazoles having the general formula:

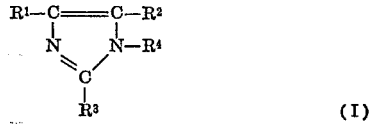

(I)

where $R^1$, $R^2$ and $R^3$ may be identical or different and each denotes a hydrogen atom or an aliphatic, araliphatic, cycloaliphatic or aromatic radical and $R^4$ denotes an aliphatic radical, and $R^1$ and $R^2$ may also together be members of a condensed aromatic ring, are obtained advantageously when an imidazole having the general Formula II:

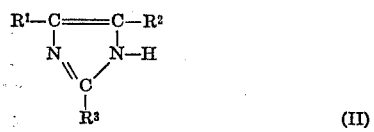

(II)

where $R^1$, $R^2$ and $R^3$ have the above meanings is reacted with a compound having the general Formula III:

$$R^4\text{—O—}R^5 \quad \text{(III)}$$

where $R^4$ has the above meanings and $R^5$ denotes a hydrogen atom or an aliphatic radical, at a temperature of from 200° to 450° C. in the presence of, as catalyst, alumina, pumice or titanium oxide having at least 5% phosphoric acid deposited thereon or alumina impregnated with at least 5% of $Ca(H_2PO_4)$ or thorium oxide in an amount equivalent to at least 5% $Th(NO_3)_4$.

When 2-methylimidazole and dimethyl ether are used, the reaction may be reproduced by the following equation:

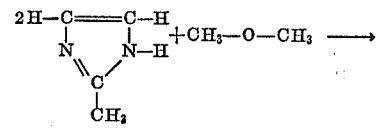

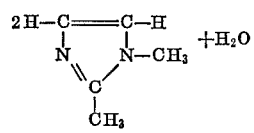

As compared with prior art methods, the process according to this invention gives a large number of imidazoles bearing substituents on the nitrogen atom in a simpler manner and in better yields and purity.

Imidazoles having the general Formula II which bear a replaceable hydrogen atom on a nitrogen atom are used as starting materials. Preferred starting materials (II) and accordingly preferred end products (I) are those in whose formulae $R^1$, $R^2$ and $R^3$ may be identical or different and each denotes a hydrogen atom or an alkyl, aralkyl, cycloalkyl or aryl group preferably having up to twelve carbon atoms and $R^1$ and $R^2$ together with the carbon atoms to which they are attached may be phenylene.

Thus for example, in addition to imidazole itself, the following substituted imidazoles may be used as starting materials (II): 2-methylimidazole, 2-cyclohexylimidazole, 2-benzylimidazole, 2-phenylimidazole and corresponding imidazoles bearing substituents in the 4- or 5-position; 2,4-dimethylimidazole, 2,4-dicyclohexylimidazole, 2,4-dibenzylimidazole, 2,4-diphenylimidazole and corresponding disubstituted or trisubstituted imidazoles bearing the substituents in the 2-, 4- and/or 5-position; 2-phenyl-4-methyl-5-ethylimidazole, 2-propyl-4-benzyl-5-phenylimidazole, benzimidazole, 4-methyl-5-phenylimidazole, 5-methyl-4-phenylimidazole and 4,5-dimethylimidazole.

Further starting materials used are alcohols or ethers having the general Formula III which are reacted in stoichiometric amounts with reference to starting material (II) or in excess, preferably in an excess of up to eight times. Preferred starting materials (III) and accordingly preferred end products (I) are those in whose formula $R^4$ denotes an alkyl, alkenyl or alkynyl radical having in each case up to twenty-five, particularly up to sixteen, carbon atoms and $R^5$ denotes a hydrogen atom or a radical with the preferred meaning of $R^4$. The radicals $R^4$ and/or $R^5$ may be linear or branched. When $R^4$ and $R^5$ denote different alkyl, alkenyl or alkynyl radicals in the same starting material, a mixture of appropriately substituted imidazoles is obtained.

For example the following alcohols and ethers may be used as starting materials (III): methanol, ethanol, propanol, butanol, hexanol, octanol, decanol, dodecanol, dimethyl ether and dialkyl ethers corresponding to the said alcohols, methyl ethyl ether, benzyl propyl ether, isobutyl alcohol, sec-dibutyl ether, diisopropyl ether, crotyl alcohol, allyl alcohol and neopentyl alcohol.

The reaction is carried out in the presence of catalysts in the form of oxides and/or phosphates of metals of Group 2, 3 or 4 of the Periodic System. Preferred compounds of this type are based on metals of main groups 2 and 3 and subgroup 4 of the Periodic System, particularly calcium, aluminum, titanium and thorium. The said compounds may be supplied to the reaction singly or in any desired mixture with one another. In batchwise operation, the catalyst is generally used in an amount of from 1 to 50%, preferably from 2 to 20%, by weight with reference to the starting material (II). In continuous operation the amount of catalyst used is as a rule 1 part to from 0.1 to 0.2 part of starting material (II) per hour. The catalysts may be modified in their structure of surface prior to use by physical or chemical treatment, for example by ignition, treatment with steam, impregnation with acids, for example phosphoric acid, or salt solutions, for example nitrates, formates or oxalates of the said metals. The catalyst may also be applied to a carrier material, for example quartz powder, ceramic material, or pumice by impregnation or precipitation and if necessary converted into its final oxide form by thermal treatment or decomposition. The carrier material may if desired contain compounds of other elements, for example sodium, which do not substantially affect the reaction. The shape and size of the catalyst particles are not of crucial importance for the reaction; granular catalysts having a particle size of from 0.1 to 4 mm. are generally used.

The reaction is carried out at a temperature of from 200° to 450° C., preferably from 300° to 400° C., at atmospheric or superatmospheric pressure, continuously or batchwise.

The reaction may be carried out as follows: a mixture of the starting materials (II) and (III) is passed over the catalyst, heated to reaction temperature, in a tubular or fluidized bed reactor. If desired gases which are inert under the reaction conditions, for example nitrogen, may be supplied in addition to the mixture of starting materials. The end product is isolated by fractional distillation from the reaction mixture leaving the reactor.

The compounds which can be prepared by the process according to this invention are intermediates for the production of dyes, textile auxiliaries and insecticides. Regarding the use of substituted imidazoles reference is made to U.S. Pat. 2,404,299, and U.S. Pat. 3,531,494. The latter patent discloses use of substituted imidazoles as active, synergistic ingredients in insecticidal compositions in admixture with pyrethrins, carbamates and phosphoric acid esters.

The invention is illustrated by the following examples. The parts specified in the examples are parts by weight.

EXAMPLE 1

A solution of 68 parts of imidazole in 96 parts of methanol is fed during sixty-eight hours into the top of a vertical tubular reactor which is filled with 5 parts of granular aluminum oxide and heated to 350°. The reaction mixture withdrawn after passage through the bed of catalyst is distilled. After the excess of methanol has been removed, 59 parts of 1-methylimidazol boiling at 193° C. (760 mm.) and 5 parts of imidazole are obtained. This is a yield of about 78% of the theory with reference to reacted starting material.

In the examples set out in the following table, the reaction carried out in the same way and with the same starting materials as in Example 1 but at different temperatures and with different catalyst compositions; yields are given in the table.

The catalysts are prepared as follows:

(a) $Al_2O_3.5\%H_3PO_4$: 100 parts of gamma-$Al_2O_3$ having a particle diameter of 4 mm. has 5 parts of $H_3PO_4$ applied thereto by impregnation with 100 parts of a 5% aqueous $H_3PO_4$ solution and evaporation of the water in vacuo. The catalyst is first dried at about 100° C. and then placed in the reactor. Nitrogen is passed over at about 400° C. until moisture no longer escapes.

($a^1$) $Al_2O_3.10\%H_3PO_4$: the same procedure is adopted as under (a) but double the amount of $H_3PO_4$ is used.

(b) pumice.$5\%H_3PO_4$: 100 parts of granular coarse-pored pumice has 5 parts of $H_3PO_4$ applied thereto by impregnation with $H_3PO_4$ solution as in the case of catalyst (a) and is then dried and pretreated as under (a).

(c) $TiO_2.5\%H_3PO_4$: 100 parts of granular $TiO_2$ which has previously been calcined at 700° C. is charged into a reaction flask, the flask is evacuated and 100 parts of a 5% aqueous solution of $H_3PO_4$ is sprayed onto the catalyst composition with the agitator running. The major portion of the water introduced is removed by evaporation in vacuo and the remaining moisture is expelled in the reactor at about 400° C. by passing nitrogen over it.

(d) $Al_2O_3.5\%Ca(H_2PO_4)_2$: 5 parts of $Ca(H_2PO_4)_2$ is deposited on 100 parts of gamma-$Al_2O_3$ as in the case of catalyst (a) and dried in the same way.

The following abbreviations are used in Table 1:

Ex.=Example No.
Parts=Parts of starting material (II)
T=temperature in ° C.
YP=yield in parts
Y%=yield in percent of the theory with reference to imidazole reacted

TABLE 1

| Ex. | Parts | Catalyst | T | YP | Y, percent |
|---|---|---|---|---|---|
| 2 | 68 | (a) | 350 | 78 | 95 |
| 3 | 68 | (a) | 400 | 80 | 98 |
| 4 | 68 | ($a^1$) | 250 | 74 | 90 |
| 5 | 68 | (b) | 350 | 68 | 83 |
| 6 | 68 | $TiO_2$ | 350 | 73 | 89 |
| 7 | 68 | (c) | 400 | 79 | 96 |
| 8 | 68 | (d) | 400 | 69 | 84 |

EXAMPLE 9

A solution of 68 parts of imidazole in 140 parts of ethanol is passed in the course of 68 hours through a vertical tubular reactor which has been filled with 5 parts of catalyst composition $Al_2O_3.5\%H_3PO_4$ and heated to 350° C. The reaction mixture leaving the reactor and worked up according to Example 1 contains (in addition to an excess of ethanol) 85 parts of 1-ethylimidazole (B.P. 100° C. at 41.6 mm.) and 4 parts of imidazole. This is a yield of 94%.

In the same way as imidazole is alkylated with ethanol in Example 9, it is alkylated with higher homologous alcohols in the examples tabulated in Table 2.

The following abbreviations are use in Table 2:

Ex=Example No.; 2–MI=parts of 2-methylimidazole
SM=starting material
B.P.=boiling point in ° C. at a pressure in mm. indicated in parenthesis
YP=yield in parts
Y%=yield in percent of the theory with reference to imidazole reacted
Pr=propanol; Bu=butanol; He=hexanol;
Oc=octanol; De=decanol; Do=dodecanol;
Im=imidazole.

TABLE 2

| Ex. | Parts | SM | N-alkylimidazole | B.P. | YP | Y, percent |
|---|---|---|---|---|---|---|
| 10 | 200 / 68 | Pr / Im | 1-propylimidazole | 95 (10) | 94 | 85 |
| 11 | 220 / 68 | Bu / Im | 1-butylimidazole | 110 (11) | 95 | 76 |
| 12 | 300 / 68 | He / Im | 1-hexylimidazole | 128 (11) | 112 | 74 |
| 13 | 400 / 68 | Oc / Im | 1-octylimidazole | 145 (8) | 128 | 71 |
| 14 | 450 / 68 | De / Im | 1-decylimidazole | 160 (9) | 150 | 72 |
| 15 | 500 / 68 | Do / Im | 1-dodecylimidazole | 165 (1) | 165 | 70 |

EXAMPLE 16

5% of $Th(NO_3)_4$ is applied to granular aluminum oxide by impregnation with thorium nitrate solution. The catalyst composition is heated in a current of nitrogen at 400° C. until nitrous gases are no longer evolved. 1-dodecylimidazole is obtained in a yield of 173 parts (73% of the theory) from 68 parts of imidazole and 550 parts of dodecyl alcohol in a tubular reactor filled with 10 parts of the said catalyst composition and heated to 400° C. as in Example 1.

Examples of the alkylation of 2-methylimidazole with various alcohols by a method analogous to that in Example 9 are given in the following Table 3.

The following abbreviations are used in Table 3:
Ex=Example No.
Alcohol=alcohol used (amount in parts in parenthesis)
B.P.=boiling point at the pressure in mm. given in parenthesis
YP=yield in parts
Y%=yield (percent of theory)

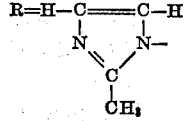

TABLE 3

| Ex. | 2-MI | Alcohol | Product | B.P. | YP | Y, percent |
|---|---|---|---|---|---|---|
| 17 | 82 | CH$_3$OH (100) | R—CH$_3$ | 204.5 (760) | 87 | 91 |
| 18 | 82 | C$_2$H$_5$OH (140) | R—C$_2$H$_5$ | 110-112 (20) | 99 | 90 |
| 19 | 82 | C$_3$H$_7$OH (200) | R—C$_3$H$_7$ | 120 (25) | 102 | 82 |
| 20 | 82 | C$_4$H$_9$OH (220) | R—C$_4$H$_9$ | 130 (20) | 98 | 71 |

EXAMPLE 21

144 parts of 2-phenylimidazole and 150 parts of methanol are passed with nitrogen as carrier gas through a fluidized bed catalyst (30 parts of Al$_2$O$_3$.5%H$_3$PO$_4$) at 350° C. in a fluidized bed reactor. The discharge from the reactor is distilled. 115 parts of 1-methyl-2-phenylimidazole (87% of the theory) boiling at 130° C. (2 mm.) and 14 parts of 2-phenylimidazole are obtained.

EXAMPLE 22

68 parts of imidazole and 138 parts of dimethyl ether are passed with nitrogen as a carrier gas through a fluidized catalyst (60 parts of Al$_2$O$_3$.5%H$_3$PO$_4$) at 330° C. in a fluidized bed reactor. 79 parts of 1-methylimidazole is recovered from the discharge by distillation. This is a yield of 96% of the theory.

Examples of alkylation of imidazoles with ethers in accordance with Example 22 are given in the following Table 4:

Ex=Example No.
Pts.=parts
IM=imidazole derivative to be reacted
Alk.=alkylating agent
RT=reaction temperature in ° C.
Cat.=percentage of H$_3$PO$_4$ in the catalyst
$$Al_2O_3.5\%H_3PO_4$$
Prod.=end product
YP=yield in parts
Y%=yield in percent of the theory

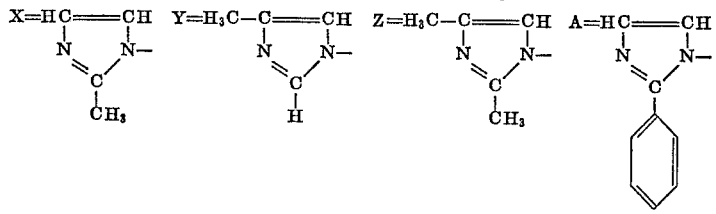

B.P.=boiling point in ° C. with the pressure in mm. in parenthesis.

TABLE 4

| Ex. | Pts. | IM | Pts. | Alk. | RT | Cat. | Prod. | B.P. | YP | Y, percent |
|---|---|---|---|---|---|---|---|---|---|---|
| 23a | 82 | X-H | 130 | CH$_3$—O—CH$_3$ | 350 | Nil | X—CH$_3$ | 204.5 (760) | 74 | 77 |
| 23b | | | | | | 5 | | | 94 | 98 |
| 24 | 82 | X-H | 210 | C$_2$H$_5$—O—C$_2$H$_5$ | 400 | 20 | X—C$_2$H$_5$ | 110-112 (20) | 99 | 90 |
| 25 | 82 | X—H | 300 | C$_4$H$_9$—O—C$_4$H$_9$ | 400 | 20 | X—C$_4$H$_9$ | 130 (20) | 109 | 79 |
| 26 | 82 | Y—H | 130 | CH$_3$—O—CH$_3$ | 350 | 5 | Y—CH$_3$ | 199 (760) | 72 | 75 |
| 27 | 96 | Z—H | 130 | CH$_3$—O—CH$_3$ | 350 | 10 | Z—CH$_3$ | 110 (2) | 107 | 97 |
| 28 | 96 | Z—H | 200 | C$_2$H$_5$—O—C$_2$H$_5$ | 350 | 10 | Z—CH$_3$ | 108 (11) | 113 | 91 |
| 29 | 144 | A—H | 130 | CH$_3$—O—CH$_3$ | 350 | 5 | A—CH$_3$ | 130 (2) | 149 | 94 |

We claim:
1. A process for the production of a substituted imidazole having the formula:

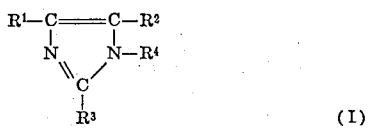

(I)

where $R^1$, $R^2$ and $R^3$ may be identical or different and each denotes a hydrogen atom, alkyl of 1–12 carbon atoms, cyclohexyl, benzyl or phenyl and $R^4$ denotes alkyl of 1–12 carbon atoms, and $R^1$ and $R^2$ together with the carbon atoms to which they are attached may be phenylene wherein an imidazole having the formula:

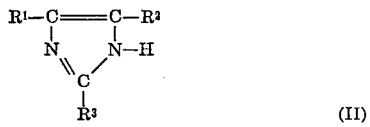

(II)

where $R^1$, $R^2$ and $R^3$ have the above meanings is reacted with a compound having the formula:

$$R^4\text{—O—}R^5 \quad (III)$$

where $R^4$ has the above meanings and $R^5$ denotes a hydrogen atom, alkyl of 1–12 carbon atoms or benzyl, at a temperature of from 200° to 450° C. in the presence of, as catalyst, alumina, pumice or titanium oxide having at least 5% phosphoric acid deposited thereon.

2. A process as claimed in claim 1 wherein the starting material (III) is used in an excess of up to eight times with reference to starting material (II).

3. A process as claimed in claim 1 wherein the reaction is carried out with said catalyst in an amount of 1 to 50% by weight with reference to the starting material (II).

4. A process as claimed in claim 1 wherein the reaction is carried out with said catalyst in an amount of 2 to 20% by weight with reference to the starting material (II).

5. A process as claimed in claim 1 wherein the reaction is carried out continuously with 0.1 to 0.2 part of starting material (II) per hour per part of said catalyst.

6. A process as claimed in claim 1 carried out at a temperature of from 300° to 400° C.

7. A process as claimed in claim 1 wherein starting material (III) is an ether.

References Cited

UNITED STATES PATENTS 3,177,223    4/1965    Erner _____ 260—309

FOREIGN PATENTS 1,324,155    3/1963    France _____ 260—577

OTHER REFERENCES

Derrien et al., I Chem. Abst. vol. 58, col. 12, 383 (1962).
Derrien et al., II Bull. Soc. Chim. France 1962, pp. 2164–73 (1962).
Suter et al., Chem. Abst. vol. 59, col. 12, 704 (1963).
Popov et al., Chem. Abst. vol. 59, col. 3346–7 (1963).

NATALIE TROUSOF, Primary Examiner

U.S. Cl. X.R.

260—309, 999